(12) United States Patent
Xu et al.

(10) Patent No.: US 11,895,024 B2
(45) Date of Patent: Feb. 6, 2024

(54) METHOD, DEVICE AND COMPUTER READABLE MEDIUM FOR DELIVERING DATA-PLANE PACKETS BY USING SEPARATE TRANSPORT SERVICE VNFC

(71) Applicant: NOKIA TECHNOLOGIES OY, Espoo (FI)

(72) Inventors: Lei Xu, Zhejiang (CN); Bing Zhang, Zhejiang (CN); Mingming Xia, Zhejiang (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 343 days.

(21) Appl. No.: 17/262,410

(22) PCT Filed: Jul. 24, 2018

(86) PCT No.: PCT/CN2018/096822
§ 371 (c)(1),
(2) Date: Jan. 22, 2021

(87) PCT Pub. No.: WO2020/019159
PCT Pub. Date: Jan. 30, 2020

(65) Prior Publication Data
US 2021/0297347 A1 Sep. 23, 2021

(51) Int. Cl.
*H04L 12/741* (2013.01)
*H04L 12/931* (2013.01)
(Continued)

(52) U.S. Cl.
CPC .............. *H04L 45/74* (2013.01); *H04L 49/70* (2013.01)

(58) Field of Classification Search
None
See application file for complete search history.

(56) References Cited

U.S. PATENT DOCUMENTS

2016/0127333 A1   5/2016   Sood et al.
2016/0353493 A1   12/2016  Vrzic et al.
(Continued)

FOREIGN PATENT DOCUMENTS

CN   105577637 A   5/2016
CN   105960789 A   9/2016

OTHER PUBLICATIONS

International Search Report and Written Opinion dated Apr. 25, 2019 corresponding to International Patent Application No. PCT/CN2018/096822.

(Continued)

*Primary Examiner* — Hong Shao
(74) *Attorney, Agent, or Firm* — SQUIRE PATTON BOGGS (US) LLP

(57) ABSTRACT

A method, device and computer readable medium for delivering packets. The method comprises in response to receipt of, at a first VNFC, a data-plane packet for a terminal device, performing a predetermined transport processing of the packet to obtain a processed packet (610); the packet including a network address of the first VNFC as a destination address; forwarding the processed packet from the first VNFC to a virtual switch (620); and delivering the processed packet from the virtual switch to a second VNFC based on a first mapping between an identity of the terminal device and an identity of the second VNFC (630); the second VNFC separated from the first VNFC, the second VNFC serving the terminal device and including at least one first data-plane application.

16 Claims, 8 Drawing Sheets

(51) Int. Cl.
H04L 45/74 (2022.01)
H04L 49/00 (2022.01)

(56) References Cited

U.S. PATENT DOCUMENTS

2017/0086049 A1   3/2017  Vrzic
2017/0208011 A1*  7/2017  Bosch .................... H04L 47/29
2018/0026992 A1   1/2018  Paczkowski et al.
2018/0070262 A1*  3/2018  Nakano .................. H04L 45/64

OTHER PUBLICATIONS

Office Action dated Oct. 8, 2022, corresponding to Chinese Patent Application No. 2018800979403.
Search Report dated Sep. 27, 2022, corresponding to Chinese Patent Application No. 2018800979403.
Extended European Search Report dated Feb. 10, 2022 corresponding to European Patent Application No. 18927927.6.
Office Action dated Feb. 23, 2023, corresponding to Chinese Patent Application No. 201880097940.3.

* cited by examiner

METHOD, DEVICE AND COMPUTER READABLE MEDIUM FOR DELIVERING DATA-PLANE PACKETS BY USING SEPARATE TRANSPORT SERVICE VNFC

FIELD

Embodiments of the present disclosure generally relate to the field of telecommunications, and in particular, to a method, device and computer readable medium for delivering data-plane packets by using a separate transport service virtual network function component (VNFC).

BACKGROUND

A cloud radio access network (RAN) is cloud-based access network architecture in a cellular network. In the cloud RAN, network device functions are implemented in a cloud server and a radio access point (RAP). Network functions virtualization (NFV) may be utilized on the cloud server. NFV involves implementing network functions in software that can run on standard server hardware, and that can be moved to, or instantiated in, various locations in the network as required, without the need to install new proprietary equipment.

A VNFC is an internal component of a virtualized network function. A VNFC including one or more data-plane applications is referred to as a data-plane VNFC. Data-plane VNFCs supporting the fourth generation (4G) and the fifth generation (5G) communication protocols handle very high traffic throughput, such as giga bits per second of receiving, processing and transmit of data. Conventional deployments of the data-plane VNFCs limit the flexibility in scaling or resilience of the data-plane VNFCs.

SUMMARY

In general, example embodiments of the present disclosure provide a method, device and computer readable medium for data-plane packets delivery.

In a first aspect, a method of delivering packets is provided. The method comprises performing, in response to receipt of at a first VNFC a data-plane packet for a terminal device from a virtual switch, a predetermined transport processing of the packet to obtain a processed packet. The packet is targeted to a second VNFC and includes a network address of the first VNFC as a destination address. The method also comprises forwarding the processed packet from the first VNFC to the virtual switch. The method also comprises delivering the processed packet from the virtual switch to the second VNFC based on a first mapping between an identity of the terminal device and an identity of the second VNFC. The second VNFC is separated from the first VNFC, the second VNFC serves the terminal device and includes at least one first data-plane application.

In some embodiments, the first VNFC and the virtual switch are implemented on a single server, a first memory area on the server is allocated to the first VNFC, a second memory area on the server is allocated to the virtual switch, and the first memory area is isolated from the second memory area.

In some embodiments, forwarding the processed packet from the first VNFC to the virtual switch comprises: causing the processed packet in the first memory area to be accessed by the virtual switch via an address offset adjustment of the second memory area.

In some embodiments, the method further comprises: in response to receipt of, at the first VNFC, a control-plane packet for the terminal device, determining whether a destination address in the control-plane packet matches a preconfigured address; and in response to the destination address in the control-plane packet matching the preconfigured address, delivering the control-plane packet to a kernel protocol stack of an operating system running on the server.

In some embodiments, computing resources and storage resources are allocated to the first VNFC based on at least one of the following: the number of VNFCs served by the first VNFC, and overall traffic throughput of the VNFCs.

In some embodiments, the method further comprises: including, at the second VNFC, the network address of the first VNFC or an identity of a third VNFC as a destination address in a further data-plane packet for the terminal device, the third VNFC separated from the first VNFC and including at least one second data-plane application; and forwarding the further packet to the virtual switch.

In some embodiments, the method further comprises: in response to receipt of; at the virtual switch, the further data-plane packet, determining whether the destination address in the further data-plane packet is the network address of the first VNFC or the identity of the third VNFC; in response to determining that the destination address in the further data-plane packet is the network address of the first VNFC, delivering the further data-plane packet to the first VNFC; and in response to determining that the destination address in the further data-plane packet is the identity of the third VNFC, delivering the further data-plane packet to the third VNFC.

In some embodiments, the method further comprises: in response to a failure of the second VNFC or a determination that traffic throughput of the second VNFC exceeds a threshold throughput, establishing, by a control-plane VNFC, a logical connection between the terminal device and a fourth VNFC, the control-plane VNFC comprising at least one control-plane application, the fourth VNFC separated from the first VNFC and including the at least one first data-plane application; configuring, by the control-plane VNFC, the virtual switch with a second mapping, the second mapping being between the identity of the terminal device and an identity of the fourth VNFC; and delivering the packet from the virtual switch to the fourth VNFC based on the second mapping.

In a second aspect, a method of delivering packets is provided. The method comprises: receiving, at a first VNFC, a data-plane packet for a terminal device from a virtual switch, the packet being forwarded from a second VNFC to the virtual switch and including a network address of the first VNFC as a destination address, the second VNFC separated from the first VNFC, the second VNFC serving the terminal device and including at least one first data-plane application; and performing a predetermined transport processing of the packet to obtain a processed packet; delivering the processed packet to an external communication peer In a third aspect, a method of delivering packets is provided. The method comprises: forwarding, from a second Virtual Network Function Component (VNFC) to a virtual switch, a data-plane packet for a terminal device, the packet being targeted to an external communication peer and including a network address of a first VNFC as a destination address, the first VNFC performing a predetermined transport processing of the packet, the second VNFC serving the terminal device and including at least one data-plane application, the second VNFC separated from the first VNFC; and delivering the packet from the virtual switch to the first VNFC based on a mapping between an identity of the terminal device and an identity of the second VNFC.

In a fourth aspect, a method of delivering packets is provided. The method comprises: receiving, at a second VNFC, a data-plane packet for a terminal device from a virtual switch, the packet being forwarded from a first VNFC to the virtual switch, the first VNFC performing a predetermined transport processing of the packet, the second VNFC serving the terminal device and including at least one data-plane application, the second VNFC separated from the first VNFC; and processing the packet based on the at least one data-plane application.

In a fifth aspect, there is provided a device for delivering packets. The device comprises at least one processor and at least one memory including computer program code. The at least one memory and the computer program code are configured to, with the at least one processor, cause the device to perform acts comprising: in response to receipt of, at a first Virtual Network Function Component (VNFC), a data-plane packet for a terminal device, performing a predetermined transport processing of the packet to obtain a processed packet, the packet including a network address of the first VNFC as a destination address; forwarding the processed packet from the first VNFC to a virtual switch; and delivering the processed packet from the virtual switch to a second VNFC based on a first mapping between an identity of the terminal device and an identity of the second VNFC, the second VNFC separated from the first VNFC, the second VNFC serving the terminal device and including at least one first data-plane application.

In a sixth aspect, there is provided a device for delivering packets. The device comprises at least one processor and at least one memory including computer program code. The at least one memory and the computer program code are configured to, with the at least one processor, cause the device to perform acts comprising: receiving, at a first Virtual Network Function Component (VNFC), a data-plane packet for a terminal device from a virtual switch, the packet being forwarded from a second VNFC to the virtual switch and including a network address of the first VNFC as a destination address, the second VNFC separated from the first VNFC, the second VNFC serving the terminal device and including at least one first data-plane application; and performing a predetermined transport processing of the packet to obtain a processed packet; delivering the processed packet to an external communication peer.

In a seventh aspect, there is provided a device for delivering packets. The device comprises at least one processor and at least one memory including computer program code. The at least one memory and the computer program code are configured to, with the at least one processor, cause the device to perform acts comprising: forwarding, from a second Virtual Network Function Component (VNFC) to a virtual switch, a data-plane packet for a terminal device, the packet being targeted to an external communication peer and including a network address of a first VNFC as a destination address, the first VNFC performing a predetermined transport processing of the packet, the second VNFC serving the terminal device and including at least one data-plane application, the second VNFC separated from the first VNFC; and delivering the packet from the virtual switch to the first VNFC based on a mapping between an identity of the terminal device and an identity of the second VNFC.

In an eighth aspect, there is provided a device for delivering packets. The device comprises at least one processor and at least one memory including computer program code. The at least one memory and the computer program code are configured to, with the at least one processor, cause the device to perform acts comprising: receiving, at a second VNFC, a data-plane packet for a terminal device from a virtual switch, the packet being forwarded from a first VNFC to the virtual switch, the first VNFC performing a predetermined transport processing of the packet, the second VNFC serving the terminal device and including at least one data-plane application, the second VNFC separated from the first VNFC; and processing the packet based on the at least one data-plane application In a ninth aspect, there is provided a computer-readable medium storing a computer program thereon. The computer program, when executed by a processor, causes the processor to carry out the method according to the first aspect.

In a tenth aspect, there is provided a computer-readable medium storing a computer program thereon. The computer program, when executed by a processor, causes the processor to carry out the method according to the second aspect.

In a eleventh aspect, there is provided a computer-readable medium storing a computer program thereon. The computer program, when executed by a processor, causes the processor to carry out the method according to the third aspect.

In a twelfth aspect, there is provided a computer-readable medium storing a computer program thereon. The computer program, when executed by a processor, causes the processor to carry out the method according to the fourth aspect.

In a thirteenth aspect, there is provided an apparatus for delivering packets. The apparatus comprises: means for performing, in response to receipt of at a first Virtual Network Function Component (VNFC) a data-plane packet for a terminal device, a predetermined transport processing of the packet to obtain a processed packet, the packet including a network address of the first VNFC as a destination address; means for forwarding the processed packet from the first VNFC to a virtual switch; and means for delivering the processed packet from the virtual switch to a second VNFC based on a first mapping between an identity of the terminal device and an identity of the second VNFC, the second VNFC separated from the first VNFC, the second VNFC serving the terminal device and including at least one first data-plane application.

In a fourteenth aspect, there is provided an apparatus for delivering packets. The apparatus comprises: means for receiving, at a first Virtual Network Function Component (VNFC), a data-plane packet for a terminal device from a virtual switch, the packet being forwarded from a second VNFC to the virtual switch and including a network address of the first VNFC as a destination address, the second VNFC separated from the first VNFC, the second VNFC serving the terminal device and including at least one first data-plane application; and means for performing a predetermined transport processing of the packet to obtain a processed packet; means for delivering the processed packet to an external communication peer.

In a fifteenth aspect, there is provided an apparatus for delivering packets. The apparatus comprises: means for forwarding, from a second Virtual Network Function Component (VNFC) to a virtual switch, a data-plane packet for a terminal device, the packet being targeted to an external communication peer and including a network address of a first VNFC as a destination address, the first VNFC performing a predetermined transport processing of the packet, the second VNFC serving the terminal device and including at least one data-plane application, the second VNFC separated from the first VNFC; and means for delivering the packet from the virtual switch to the first VNFC based on a mapping between an identity of the terminal device and an identity of the second VNFC.

In a sixteenth aspect, there is provided an apparatus for delivering packets. The apparatus comprises: means for receiving, at a second VNFC, a data-plane packet for a terminal device from a virtual switch, the packet being forwarded from a first VNFC to the virtual switch, the first VNFC performing a predetermined transport processing of the packet, the second VNFC serving the terminal device and including at least one data-plane application, the second VNFC separated from the first VNFC; and means for processing the packet based on the at least one data-plane application.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
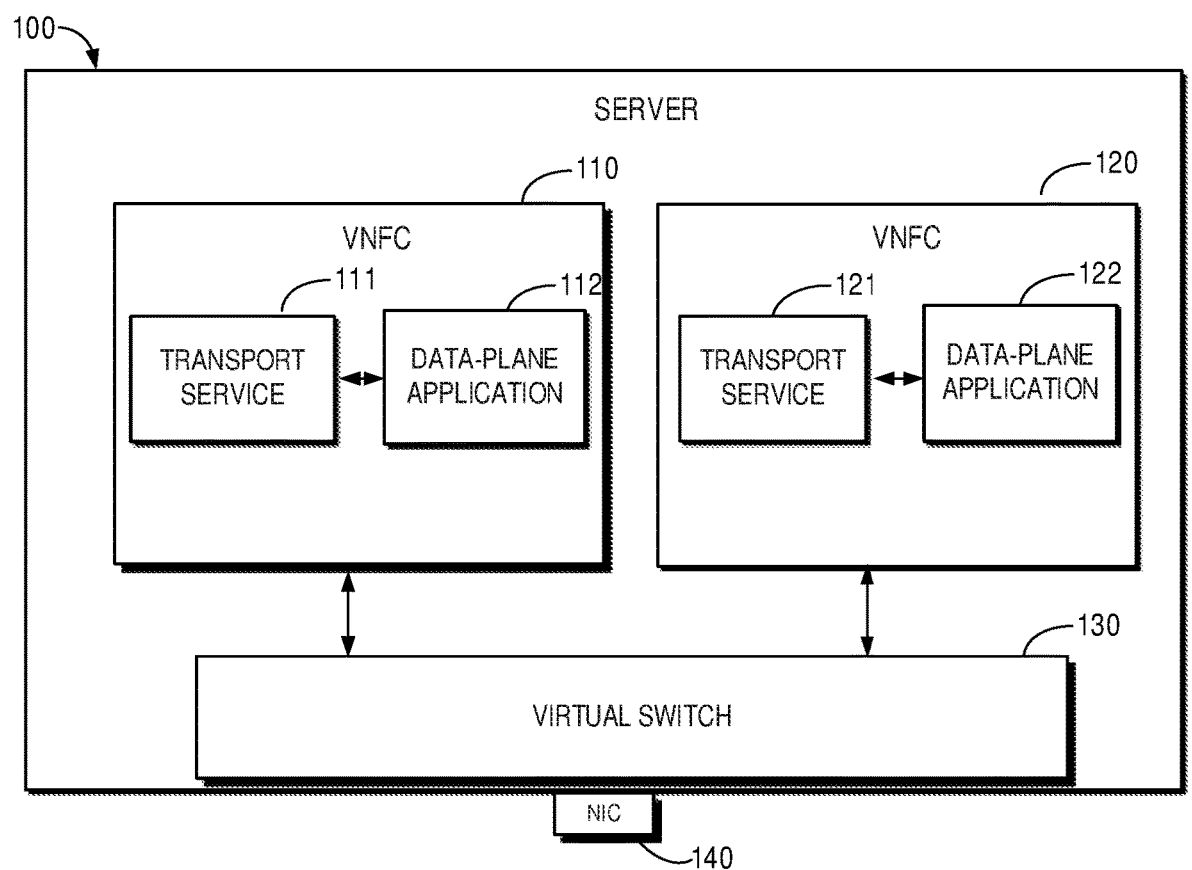
FIG. 1 is a block diagram of a conventional deployment of VNFCs on a cloud server.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, MIMO, OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following: (a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, a downlink (DL) transmission refers to a transmission from a network device to a terminal device, and an uplink (UL) transmission refers to a transmission in an opposite direction. That is, in DL, the network device is a transmitter and the terminal device is a receiver device; while in UL, the terminal device is a transmitter and the network device is a receiver device.

FIG. 1 is a block diagram of a conventional deployment of VNFCs on a cloud server 100. As shown, a VNFC 110 and a VNFC 120 are created on the cloud server 100. Each of the VNFCs 110 and 120 is connected, via network interfaces, to a virtual switch 130 for intra-server traffic communication and for communication with external communication peers.

The VNFC 110 includes transport service component 111 and a data-plane application 112. The VNFC 120 includes transport service component 121 and a data-plane application 122. Each of the transport service components 111 and 121 may receive packets from a network interface controller 140 and transmit packets to the network interface controller 140. Data-plane applications 112 and 122 are 4G or 5G's business logic software and use shared memory to exchange data-plane packets with the transport service components 111 and 121, respectively.

In the conventional deployment, a data-plane application (such as the data-plane application 112 or 122) is bound together with a transport service component (such as the transport service component 111 or 121) in a single VNFC, so as to achieve high data throughput and lower latency in data packets processing. In addition, for flat networking, the VNFC straightforwardly exposes its network address to external communication peers.

The conventional deployment will limit the flexibility in scaling or resilience of VNFCs, such as scaling-out. In case of scaling-out, it will need extra negotiations to tell peer network element VNFs to use a network address of a new VNFC for communication. If a VNFC crashes or is scaled-in, a network interface for this VNFC will be not valid for communication because that the network address of this crashed or scaling-in VNFC is exclusively assigned on this VNFC. Thus, users set up on this VNFC can't be switched over to another VNFC, leading business service break for the users. In addition, unavailable status of the network address needs extra negotiations with communication peers for exceptional handling. As such, the conventional deployment is poor to support native cloud characteristics, because native cloud requires VNFCs' scaling, resilience or rolling upgrade shall be self-sustained, shall not have side-impacts to communication peers, shall not cause business service break.

In addition, arranging data-plane application business logic together with the transport service component into a single VNFC leads to a heavy and big VNFC. From compact resource usage perspective, it will cause waste on usage of CPU resource. The transport service component must use isolated CPU for high performance processing, and it cannot share CPU resource with other application processes. In addition, if there are multiple VNFCs deployed on same hardware (HW) server, there will be multiple copies of the transport service component on the same server. Each of the multiple copies of the transport service component is usually provided with large resources to support potential maximum load. However, usually at 80% of time, service loads of the multiple copies of the transport service component would be at low level. Moreover, the transport service component inside one VNFC cannot serve data-plane applications in another VNFC. If there are multiple VNFCs including data-plane applications are created on the same HW server, HW resources over-provision for the transport service component instances would easily happen, resulting in wasteful usage of HW resources.

In this event, a solution for delivering packets is proposed. In this solution, a transport service component is split from a data-plane application component and is deployed as a separated VNFC. The transport service component can receive data-plane packets from outside of a HW server and transmit data-plane packets to outside of the HW server. A virtual switch is used for data-plane packets dispatching and load balancing between the transport service component and the data-plane application component. The data-plane application component focuses on business logic processing only, and uses layer 2 (L2) network connections to communicate with the transport service component through the virtual switch.

Figure 2:
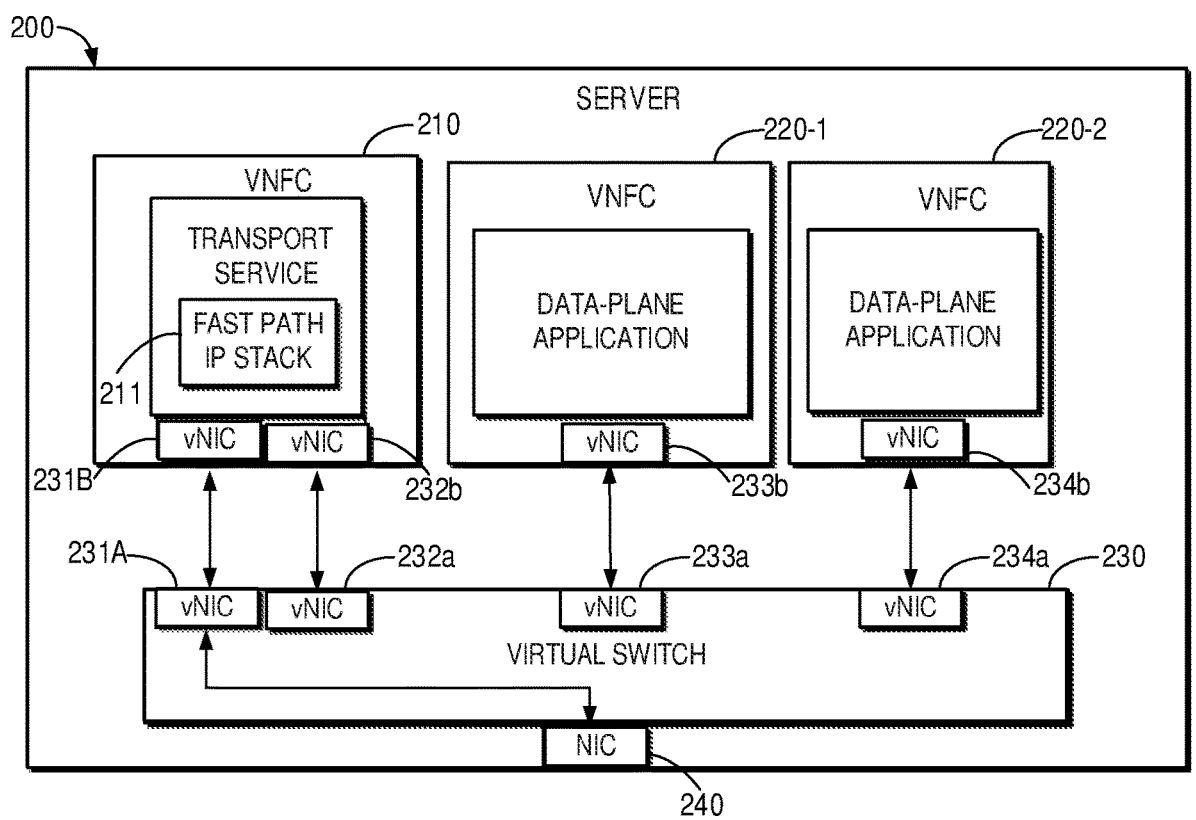
FIG. 2 is a block diagram of an example deployment of VNFCs on a cloud server in accordance with some embodiments of the present disclosure.

Principle and embodiments of the present disclosure will be described in detail below with reference to FIG. 2, which is a block diagram of an example deployment of VNFCs on a cloud server 200 in accordance with some embodiments of the present disclosure. As shown, a first VNFC 210, a second VNFC 220-1, a third VNFC 220-2, a virtual switch 230 and a virtual switch 240 are deployed on the server 200. It would be appreciated that the three VNFCs are described only for purpose of illustration without suggesting any limitation to the scope of the present disclosure. Embodiments of the present disclosure may also be applied to other deployment with more or less VNFCs.

The first VNFC 210 includes a transport service component 211. The transport service component 211 includes receiving and transmitting functionality of data-plane packets. The transport service component 211 may receive, via a virtual network interface controller (vNIC) 231*b*, data-plane packets from external communication peers, such as a neighbor cloud server or a core network. The transport service component 211 may transmit, via a vNIC 232*b*, data-plane packets to the external communication peers.

The transport service component 211 is further configured to perform a predetermined transport processing of the data-plane packets. Hereinafter, for the purpose of discussion, the "first VNFC" is also referred to as "a transport service VNFC". In some embodiments, the transport service component 211 may perform the predetermined transport processing based on a data-plane packet protocol stack. For example, the data-plane packet protocol stack may include a packet data convergence protocol (PDCP) layer, a GPRS tunneling protocol-data plane (GTP-u) layer, a user datagram protocol (UDP) layer, an internet protocol (IP) layer, and a media access control (MAC) layer.

In some embodiments, for the IP processing, the transport service component 211 may include a Fast Path Internet Protocol (IP) stack 212. The Fast Path Internet Protocol (IP) stack 212 may refer to an IP packet processing running at user space of an operating system (such as Linux). In contrast, a Slow Path IP stack or a kernel IP stack (not shown) may refer to an IP packet processing running at kernel space of the operating system. The IP packet processing running at user space may avoid frequent context switches between user space and kernel space of the operating system. Thus, the IP packet processing running at user space has better efficiency and performance than the IP packet processing running at kernel space. The Fast Path IP stack 212 can't work alone, it still needs to collaborate with the kernel IP stack to share using some control-plane information, such as Address Resolution Protocol (ARP), IP routes and so on.

Each of the second VNFC 220-1 and the third VNFC 220-2 is configured to serve one or more terminal devices, and includes at least one data-plane applications. Hereinafter, for the purpose of discussion, a VNFC including at least one data-plane applications (such as the second VNFC 220-1 or the third VNFC 220-2) is also referred to as "a data-plane VNFC". Examples of the data-plane applications may include, but not limited to, video call applications, applications for receiving, processing and transmit of radio link control (RLC) or PDCP data, virtual reality applications, games applications and so on. It would be understood that two data-plane VNFCs are described only for purpose of illustration without suggesting any limitation to the scope of the present disclosure. More or less data-plane VNFCs may be deployed on a single server.

The data-plane VNFC 220-1 may receive from the virtual switch 240 data-plane packets or transmit to the virtual switch 240 data-plane packets via the vNIC 233*b*. Similarly, the data-plane VNFC 220-2 may receive from the virtual switch 240 data-plane packets or transmit to the virtual switch 240 data-plane packets via the vNIC 234*b*.

In some embodiments, each of the transport service VNFC 210 and data-plane VNFCs 220-1 and 220-2 may be implemented in form of virtual machine or container.

The virtual switch 230 is configured to receive data-plane packets for a terminal device from the external communication peers or transmit data-plane packets to the external communication peers via a physical NIC 240. The physical NIC 240 is virtualized into vNIC 231*a*, 232*a*, 233*a* and 234*a*. The vNIC 231*a* and the vNIC 231*b* on the transport service VNFC 210 are used in pairs, and the vNIC 232*a* and the vNIC 232*b* on the transport service VNFC 210 are used in pairs. The vNIC 233*a* and the vNIC 233*b* on the data-plane VNFC 220-1 are used in pairs. The vNIC 234*a* and the vNIC 234*b* on the data-plane VNFC 220-2 are used in pairs.

In some embodiments, computing resources and storage resources are allocated to the transport service VNFC 210 based on at least one of the following: the number of data-plane VNFCs served by the transport service VNFC 210 (deployed on the same server) and overall traffic throughput of the data-plane VNFCs. In this way, resource utilization rate of the transport service VNFC 210 can be improved and waste of computing resources and storage resources can be avoided.

In some embodiments, a first memory area on the server 200 200 is allocated to the transport service VNFC 210, a second memory area on the server 200 is allocated to the virtual switch 230, a third memory area on the server 200 is allocated to the data-plane VNFC 220-1 and a fourth memory area on the server 200 is allocated to the data-plane VNFC 220-2. The first, second, third and fourth memory areas are isolated from one another. In this manner, there are no interferences among the transport service VNFC 210, the virtual switch 230 and the data-plane VNFCs on memory write and read. Thus, security of write and read is ensured.

In accordance with embodiments of the present disclosure, the transport service VNFC 210 holds external network addresses of the data-plane VNFCs, acts as a gateway for the data-plane VNFCs, and hides the internal details of deployment and networking of the data-plane VNFCs from external. Due to this deployment and hiding, data-plane VNFC's scaling are scoped inside and become seamless, and no impacts to external communication peers.

The virtual switch 240 receives the data-plane packets from the external communication peers and forwards the data-plane packets to the transport service VNFC 210 via the vNIC 231*a*. The transport service VNFC 210 performs a predetermined transport processing of the data-plane packets to obtain process packets, and forward the processed packets to the virtual switch 240. The virtual switch 240 dispatches the processed packets to respective data-plane VNFCs based on routing rules configured by a control-plane VNFC. Each of the routing rules may include a mapping between an identity of a terminal device and an identity of a data-plane VNFC.

Figure 3:
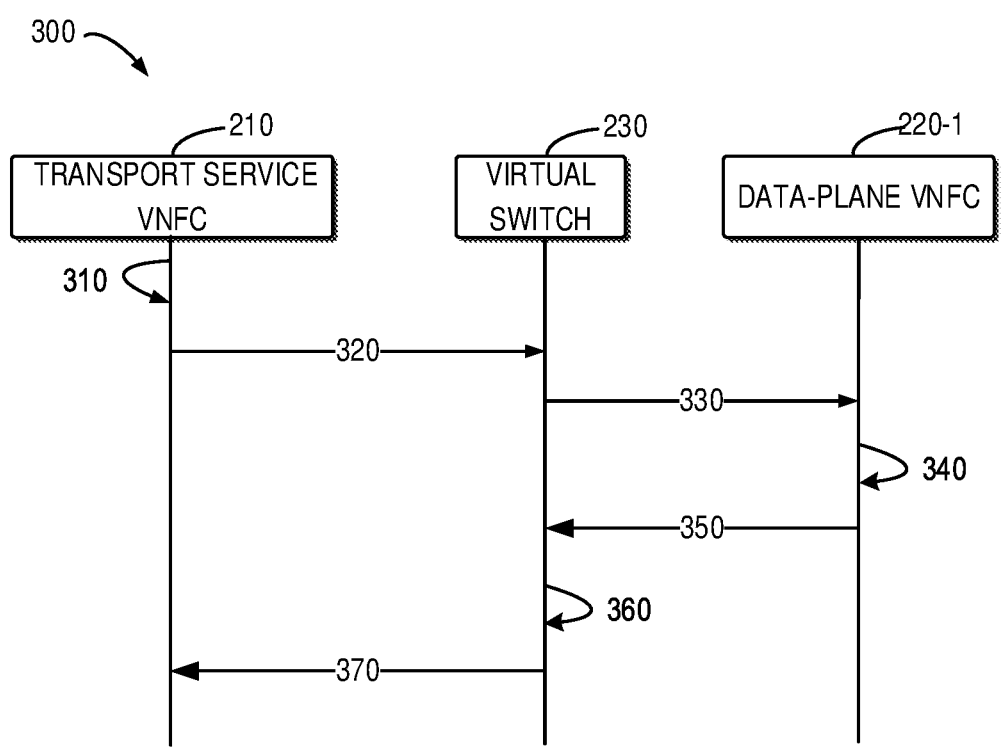
FIG. 3 is a signalling chart of an example process for delivering packets in accordance with some embodiments of the present disclosure.

FIG. 3 is a signalling chart of an example process 300 for delivering packets in accordance with some embodiments of the present disclosure. The process 300 may involve the transport service VNFC 210, the data-plane VNFC 220-1 and the virtual switch 230 as shown in FIG. 2. It is to be understood that process 300 may include additional acts not shown and/or omit some acts as shown. The scope of the present disclosure is not limited in this respect.

In response to receipt of a data-plane packet for a terminal device, the transport service VNFC 210 performs 310 a predetermined transport processing of the packet to obtain a processed packet. The packet includes a network address of the transport service VNFC 210 as a destination address. The transport service VNFC 210 forwards 320 the processed packet to the virtual switch 230.

Upon receipt of the processed packet from the transport service VNFC 210, the virtual switch 230 delivers 330 the processed packet to the data-plane VNFC 220-1 based on a first mapping between an identity of the terminal device and an identity of the data-plane VNFC 220-1. Examples of the identity of the data-plane VNFC 220-1 include, but are not limited to, an internal network address (such as IP address), a MAC address and so on.

In accordance with embodiments of the present disclosure, each of data-plane packets from the external communication peers to the data-plane VNFCs includes the network address of the transport service VNFC 210 as a destination address. Moreover, each of data-plane packets from the data-plane VNFCs to the external communication peers includes the network address of the transport service VNFC 210 as a destination address. In addition, the data-plane VNFCs use their respective identities to communicate with the transport service VNFC 210. The transport service VNFC 210 holds external network addresses of the data-plane VNFCs, acts as a gateway for the data-plane VNFCs, and hides the internal details of deployment and networking of the data-plane VNFCs from external. Due to this deployment and hiding, data-plane VNFC's scaling are scoped inside and become seamless, and no impacts to external communication peers.

The data-plane VNFC 220-1 includes 340 the network address of the transport service VNFC 210 or an identity of the third VNFC 220-2 as a destination address in a further data-plane packet for the terminal device. The data-plane VNFC 220-1 forwards 350 the further packet to the virtual switch 230.

Upon receipt of the further data-plane packet, the virtual switch 230 determines 360 whether the destination address in the further data-plane packet is the network address of the transport service VNFC 210 or the identity of the third VNFC 220-2. If the virtual switch 230 determines that the destination address in the further data-plane packet is the network address of the transport service VNFC 210, the virtual switch 230 delivers 370 the further data-plane packet to the transport service VNFC 210. On the other hand, if the virtual switch 230 determines that the destination address in the further data-plane packet is the identity of the third VNFC, the virtual switch 230 delivers the further data-plane packet to the third VNFC 220-2.

In some embodiments, each of the vNICs on the virtual switch may be implemented as vhost-user. Almost zero memory copy for data-plane packets egressing from the transport service VNFC 210 may be achieved based on the software driver of vhost-user. For the packets egressing from the transport service VNFC 210 to the virtual switch 230, the virtual switch 230 may access the processed packet in the memory area allocated to the transport service VNFC 210 via an address offset adjustment of the memory area allocated to the virtual switch 230. Thus, the virtual switch 230 can avoid the copy of packet data into its own memory area before processing the packet. In this way, the throughput performance can be significantly increased, e.g., by about 30%-50%.

Figure 4:
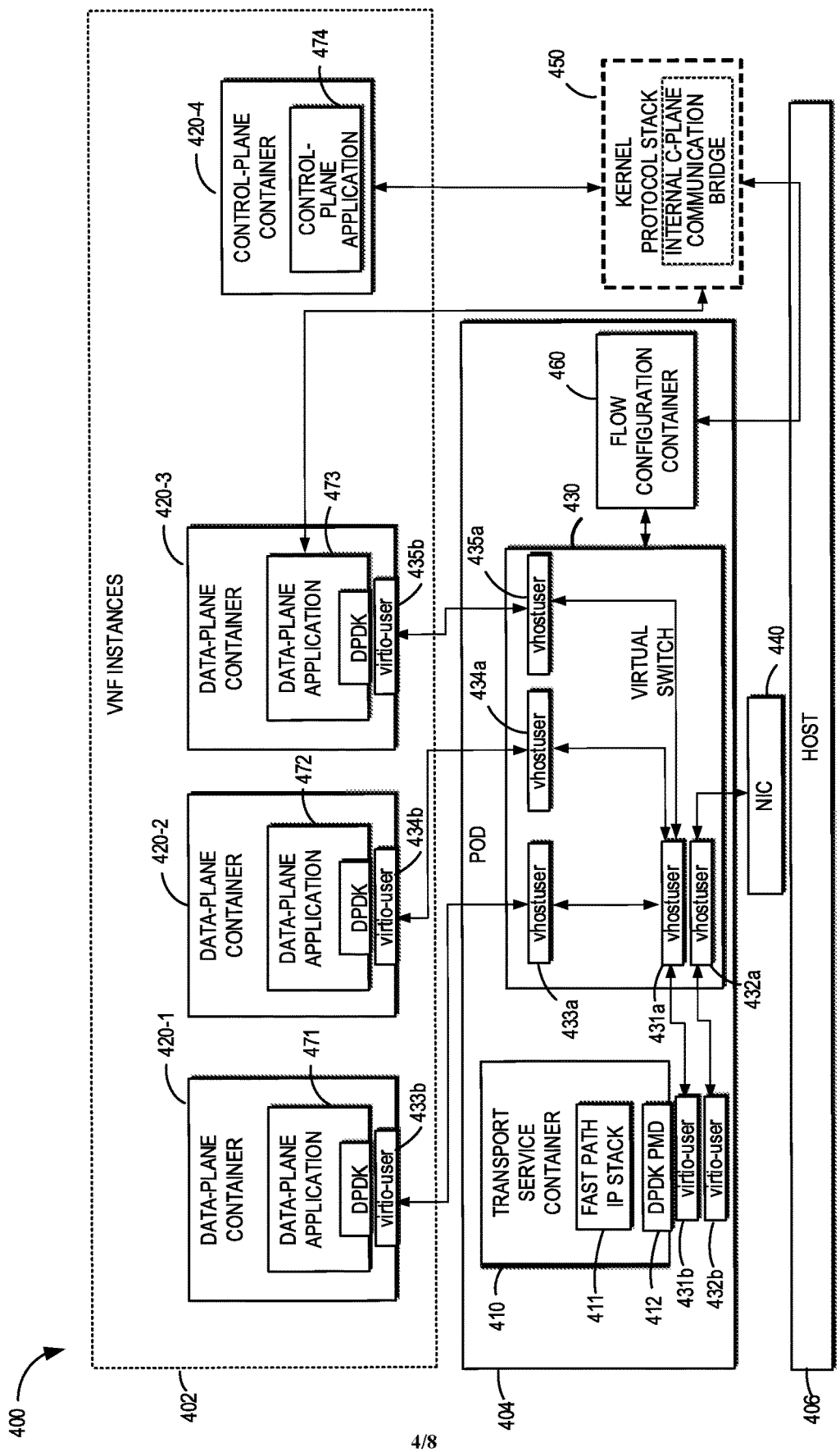
FIG. 4 is a block diagram of another example deployment of VNFCs on a cloud server in accordance with some embodiments of the present disclosure.

As described above, each of the transport service VNFC, data-plane VNFCs and the virtual switch may be implemented in form of virtual machine or container. FIG. 4 shows an example deployment of VNFCs in form of containers on a cloud server 400 in accordance with some embodiments of the present disclosure. For the purpose of discussion, a transport service VNFC in form of container is also referred to as a transport service container, a data-plane VNFC in form of container is also referred to as a data-plane container, and a control plane VNFC in form of container is also referred to as a control-plane container.

As shown, a plurality of VNF instances 402 and a pod 404 run on a host 406 of the server 400. Linux operating system runs on the host 406. The VNF instances 402 include data-plane containers 420-1, 420-2 and 420-3, and a control-plane container 420-4. The data-plane containers 420-1, 420-2 and 420-3 include data-plane applications 471, 472 and 473, respectively. The vNICs on the data-plane containers 420-1, 420-2 and 420-3 are implemented as virtio-users 433b, 434b and 435b, respectively. DPDK driver is used for each of the virtio-users 433b, 434b and 435b.

The pod 404 includes a transport service container 410 and a virtual switch container 430. The transport service container 410 may receive data-plane packets from outside of the host 406 and transmit data-plane packets to outside of the host 406. The transport service container 410 includes a Fast Path IP stack 411. Two vNICs on the transport service container 410 are implemented as virtio-user 431b and virtio-user 432b. DPDK pulling mode driver (PMD) is used for the virtio-user 431b and virtio-user 432b.

The virtual switch container 430 is configured for data-plane packets dispatching and load balancing between the transport service container 410 and the data-plane containers. The traffic between the transport service container 410 and the data-plane containers go through the virtual switch container 430. In some embodiments, the virtual switch container 430 may include an open virtual switch (OVS) DPDK container.

The virtual switch container 430 includes five vNICs virtualized from a physical NIC 440. The five vNICs are implemented as virtio-users 431a, 432a, 433a, 434a and 435a. Virtio-user 431a and virtio-user 431b on the transport service container 410 are used in pairs for receiving packets from the data-plane containers 420-1, 420-2 and 420-3, and/or transmitting packets to the data-plane containers 420-1, 420-2 and 420-3. Virtio-user 432a and virtio-user 432b on the transport service container 410 are used in pairs for receiving packets from the NIC 440 or transmitting packets to the NIC 440. The virtio-user 433a and virtio-user 433b on the data-plane container 420-1 are used in pairs. The virtio-user 434a and virtio-user 434b on the data-plane container 420-2 are used in pairs. The virtio-user 435a and virtio-user 435b on the data-plane container 420-3 are used in pairs.

The control-plane VNFC 420-4 includes at least one control-plane application 474. The control-plane VNFC 420-4 is responsible to handle signalling, such as signalling for setting up, modifying, deleting logic telecom user resources on data-plane VNFCs.

The control-plane VNFC 420-4 and each of the data-plane VNFCs may communication with one another using reliable messaging. For example, messages over Transmission Control Protocol (TCP) or Stream Control Transmission Protocol (SCTP) may be used. This kind of traffics is called as slow path traffics which go through Kernel IP stack 450 of an operating system (such as Linux). The Kernel IP stack 450 may include an internal control-plane communication bridge.

The control-plane VNFC 420-4 may configure traffic flows on the virtual switch container 430 through a flow configuration container 460. The flow configuration container 460 may include an OpenFlow configuration container. These flows are used as routing rules by the virtual switch container 430 to dispatch incoming or outgoing data-plane packets to correct destinations, such as the data-plane containers 420-1, 420-2 and 420-3.

The virtual switch container 430 has deep packet inspect functionality to identify which terminal device (or user) the packets belong to. Each of the routing rules configured by the control-plane container 420-4 may include a mapping between an identity of a terminal device and an identity (such as a MAC address) of a data-plane container. The virtual switch container 430 will follow the routing rule to dispatch packets to corresponding data-plane container.

In some embodiments, the transport service container 410 may serve both data-plane traffic and control-plane traffic, to support diverse networks co-existing, required by cloud RAN application VNFCs. In some embodiments, the transport service container 410 supports forwarding control-plane packets of preconfigured types of slow path packets. Examples of the preconfigured types include, but are not limited to, IP Virtual Local Area Network (IPVLAN) type and MACVLAN type. In order to support forwarding control-plan packets of IPVLAN type or MACVLAN type, the transport service container 410 opens an interface to allow users to configure MACVLAN addresses or IPVLAN addresses into the transport service container 410.

The transport service container 410 may create additional layer 2 (L2) filtering function and layer 3 (L3) filtering function into data-plane processing pipeline. While a control-plane packet is received at L2 or L3 of the transport service container 410, the filtering functions determine whether a destination address in the control-plane packet matches a preconfigured address (such as the configured MACVLAN address or IPVLAN address). If the destination address in the control-plane packet matches the preconfigured address, the transport service container 410 delivers the control-plane packet to a kernel IP stack 450 of an operating system running on the host 406 for further delivery.

Embodiments of the present disclosure provide a complete programmable traffic dispatching solution by the pod 404 including the transport service container 410, the virtual switch container 430 and the flow configuration container 460. On top of it, load balancing among data-plane containers become feasible, and users can be selected to be set up on a data-plane container with low load and its traffic flow can be configured.

With the load balancing solution, external network addresses of the data-plane containers are exposed on the transport service container 410. If user context can be restored onto an active data-plane container, the data-plane container's high availability becomes feasible as well. Once a data-plane container is crashed, data-plane IP interface is still up on the transport service container 410 and data-plane packets can still arrive at the transport service container 410 with an updated routing rule. The transport service container 410 can dispatch the packets to the new active data-plane container that has the restored users' logic.

With the programmable traffic dispatching solution, external network addresses of the data-plane containers are exposed on the transport service container 410. If user context can be switched to another active data-plane container, rolling upgrade of data-plane containers become feasible. The data-plane container selected to be upgraded can firstly move its logic users to another container, just internal dispatching routing rules need to be updated, and there are no impacts to external communication peers. Rolling upgrade without business logic service break becomes possible.

For the data-plane containers on the same host, only one transport service container 410 is deployed per host. Duplications of instances of transport service container 410 in the conventional deployment are removed, and the resource utilization rate is improved.

Figure 5:
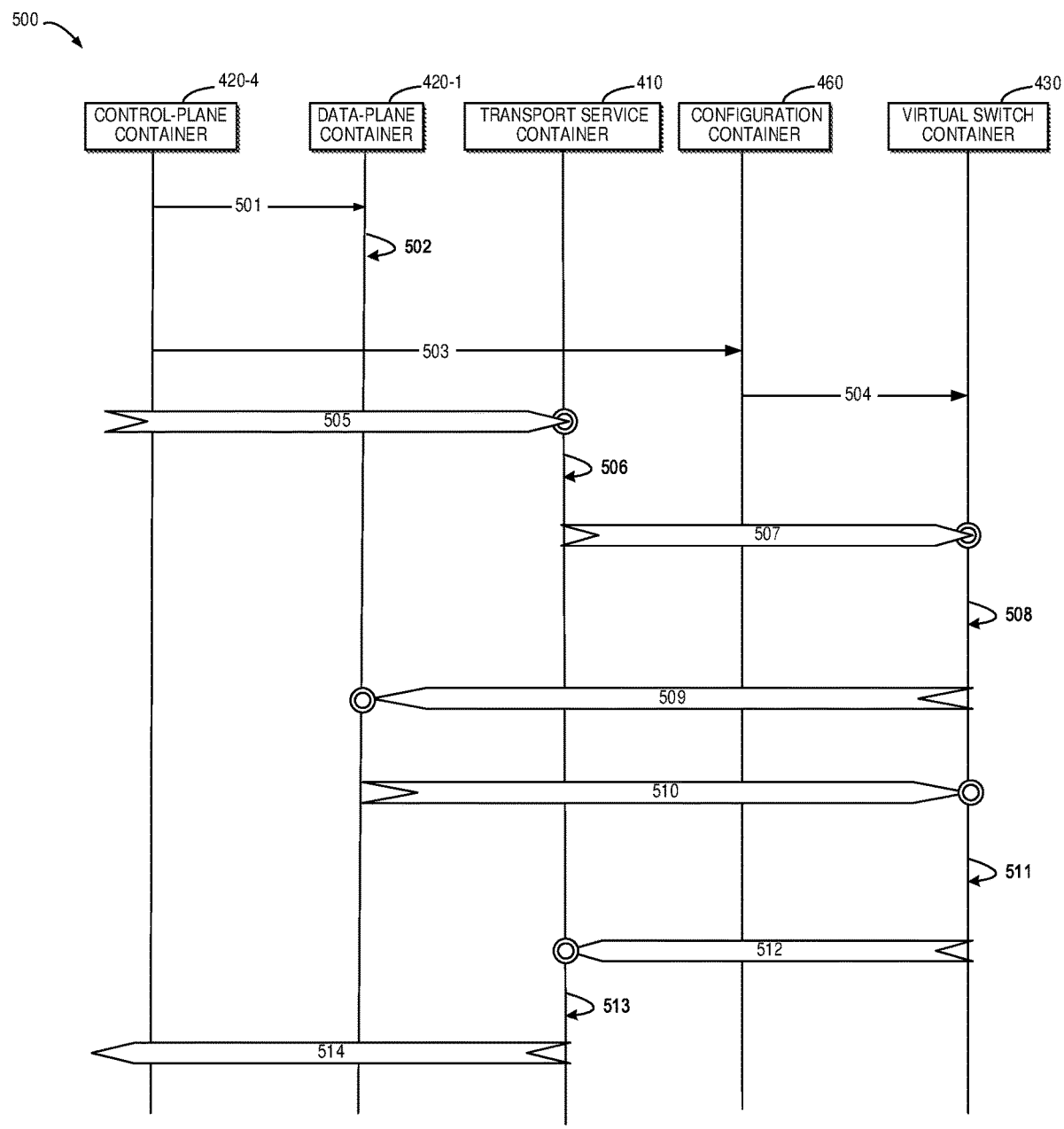
FIG. 5 is a signalling chart a schematic diagram of another example process for delivering packets in accordance with some embodiments of the present disclosure.

FIG. 5 shows a signalling chart of an example process 500 for delivering packets in accordance with some embodiments of the present disclosure. The process 500 may involve the control-plane container 420-4, the data-plane container 420-1, the transport service container 410, the flow configuration container 460, and the virtual switch container 430 as shown in FIG. 4. It is to be understood that process 500 may include additional acts not shown and/or omit some acts as shown. The scope of the present disclosure is not limited in this respect.

In response to receipt of a connection request from a terminal device (not shown), the control-plane container 420-4 may select one of a plurality of data-plane containers, such as the data-plane container 420-1, based on a load balancing policy, for example. The control-plane container 420-4 sets up 501 a logical connection between the terminal device and the data-plane container 420-1. Then, the control-plane container 420-4 may provide the network address of the transport service container 410 to the external communication peers. Thus, data-plane packets from the external communication peers will be targeted to the transport service container 410.

The control-plane VNFC 420-4 configures 503 the flow configuration container 460 with routing rules. Each of the routing rules may include a mapping between an identity of the terminal device and an identity of the data-plane container 420-1. Examples of the identity of the terminal device include, but are not limited to, TEID for the user of the terminal device. The TEID may be included in a header of a GTP-u packet. Examples of the identity of the data-plane container 420-1 include, but are not limited to, an internal IP address, a MAC address and so on.

The flow configuration container 460 configures 504, via an OpenFlow API, the virtual switch container 430 with the routing rules. The routing rules are used by the virtual switch container 430 to dispatch incoming or outgoing data-plane packets to the data-plane container 420-1.

The transport service container 410 receives 505 a data-plane packet for the terminal device from an external communication peer, such as the core network. The packet including a network address of the transport service container 410 as a destination address.

The transport service container 410 performs 506 a predetermined transport processing of the packet to obtain a processed packet. Examples of the predetermined transport processing include, but are not limited to, IP security handling, IP de-fragmentation, IP protocol handling and so on. The transport service container 410 forwards 507 the processed packet to the virtual switch container 430.

The virtual switch container 430 performs 508 a deep packet inspection on a GTP-u header to get the identity of the terminal device. The virtual switch container 430 follows the routing rule for the terminal device to dispatch 509 packets to a corresponding data-plane container, such as the data-plane container 420-1.

The data-plane container 420-1 includes the network address of the transport service container 410 or an identity of a further data-plane container (such as the data-plane container 420-2) as a destination address in a further data-plane packet for the terminal device. A default header of the packet may be MAC header, IP header, UDP header or GTP header, which is appended before the data payload. GTP header fields can be used as metadata, to fill information specific to the data-plane application. The data-plane container 420-1 can ignore the IP/UDP protocol stack processing, which will be handled by the transport service container 410. The data-plane container 420-1 forwards 510 the further packet to the virtual switch container 430.

Upon receipt of the further data-plane packet from the data-plane container 420-1, the virtual switch container 430 determines 511 whether the destination address in the further data-plane packet is the network address of the transport service container 410 or the identity of the data-plane container 420-2. If the virtual switch container 430 determines that the destination address in the further data-plane packet is the network address of the transport service container 410, the virtual switch container 430 delivers 512 the further data-plane packet to the transport service container 410. On the other hand, if the virtual switch container 430 determines that the destination address in the further data-plane packet is the identity of the data-plane container 420-2, the virtual switch container 430 delivers the further data-plane packet to the data-plane container 420-2.

Upon receipt of the further data-plane packet from the virtual switch container 430, the transport service container 410 performs 513 a predetermined transport processing of the packet to obtain a processed packet. Examples of the predetermined transport processing include, but are not limited to, IP security handling, IP fragmentation, IP protocol handling and so on. The transport service container 410 transmits 514 the processed packet to an external communication peer, such as the core network.

In some embodiments, the control-plane container 420-4 performs health checking on the data-plane containers 420-1, 420-2 and 420-3 periodically. If the control-plane container 420-4 determines a data-plane container, such as the data-plane container 420-1, fails or is scaled-in, the control-plane container 420-4 will set up a logical connection between the terminal device served by the data-plane container 420-1 and a further data-plane container, such as the data-plane container 420-2. The control-plane container 420-4 may configure, via the flow configuration container 460, the virtual switch container 430 with a mapping between the identity of the terminal device and an identity of the data-plane container 420-2. In this manner, the virtual switch container 430 may deliver the packet for the terminal device to the data-plane container 420-2 based on the mapping. Thus, business service break for the terminal device can be avoided.

In some embodiments, if traffic throughput of the data-plane container 420-1 exceeds a threshold throughput, a new data-plane container may be created. The control-plane container 420-4 will set up a logical connection between the terminal device served by the data-plane container 420-1 and the new data-plane container, such as the data-plane container 420-3. The control-plane container 420-4 will configure, via the flow configuration container 460, the virtual switch container 430 with a mapping between the identity of the terminal device and an identity of the data-plane container 420-3. In this manner, the virtual switch container 430 may deliver the packet for the terminal device to the data-plane container 420-3 based on the mapping.

In some embodiments, if a new data-plane container is created or an old data-plane container is removed due to scaling-in or failure, the routing rules (such as the mappings) need to be updated. The network address of the transport service container 410 for communication with the external communication peers is not changed. Thus, there are no any side-effects to external communication peers. In this way, it resolves the main cause of poor scalability or resilience issue in the conventional deployment, scalability and high availability of data-plane containers become self-sustained.

Telecommunication users on one data-plane container can be switched over to another active data-plane container, which has no impacts to external communication peers. This is because that the network address of the transport service container 410 for communication with the external communication peers is not changed, and only the internal addressing needs to be updated between the transport service container 410 and data-plane application containers. From application resilience perceptive, as long as the telecom users' restore speed onto new active data-plane container is fast enough, such as on the level of minor seconds, there will be no business service break in switchover from a failed data-plane container to another active data-plane container.

Figure 6:
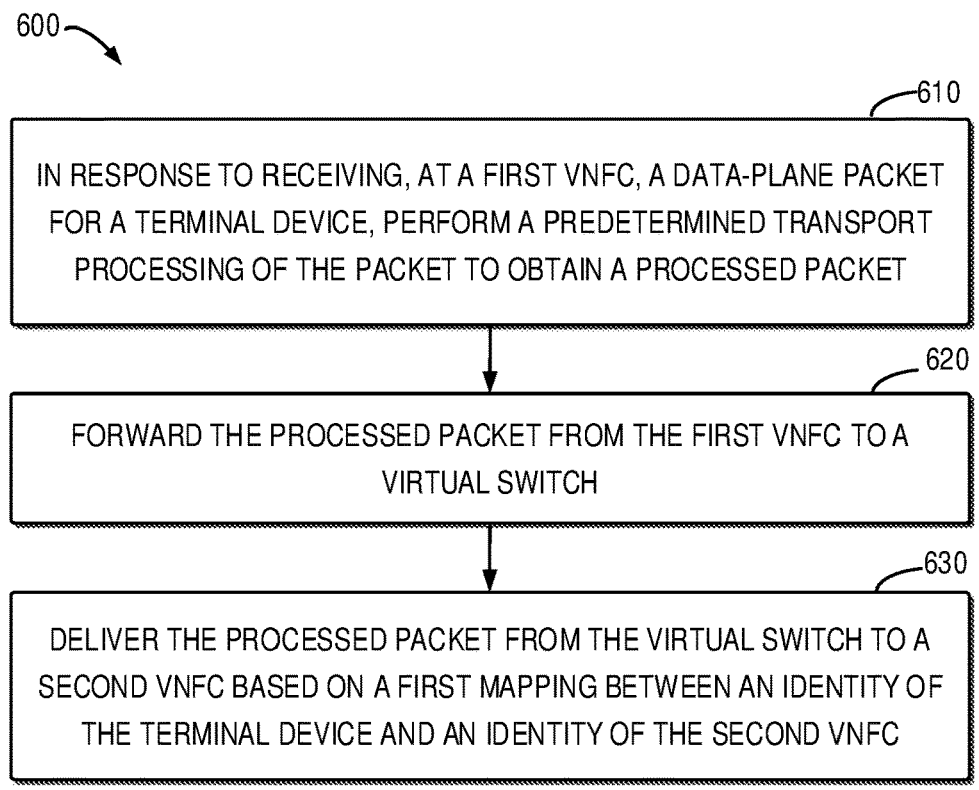
FIG. 6 is a flowchart of a method of delivering packets in accordance with some embodiments of the present disclosure.

FIG. 6 shows a flowchart of an example method 600 in accordance with some embodiments of the present disclosure. For example, the method 600 can be implemented at the transport service VNFC 210, the data-plane VNFC 220-1 and the virtual switch 230 as shown in FIG. 2. It is to be understood that the method 600 may include additional blocks not shown and/or may omit some blocks as shown, and the scope of the present disclosure is not limited in this regard.

At block 610, in response to receipt of a data-plane packet for a terminal device, the transport service VNFC 210 performs a predetermined transport processing of the packet to obtain a processed packet. The packet includes a network address of the transport service VNFC 210 as a destination address.

At block 620, the transport service VNFC 210 forwards the processed packet to the virtual switch 230.

At block 630, the virtual switch 230 delivers the processed packet to the data-plane VNFC 220-1 based on a first mapping between an identity of the terminal device and an identity of the data-plane VNFC 220-1. The data-plane VNFC 220-1 is separated from the transport service VNFC 210, the data-plane VNFC 220-1 serves the terminal device and includes at least one first data-plane application.

In some embodiments, the transport service VNFC 210 and the virtual switch are implemented on a single server, a first memory area on the server is allocated to the transport service VNFC 210, a second memory area on the server is allocated to the virtual switch 230, and the first memory area is isolated from the second memory area.

In some embodiments, forwarding the processed packet from the transport service VNFC 210 to the virtual switch 230 comprises: causing the processed packet in the first memory area to be accessed by the virtual switch 230 via an address offset adjustment of the second memory area.

In some embodiments, in response to receipt of a control-plane packet for the terminal device, the transport service VNFC 210 determines whether a destination address in the control-plane packet matches a preconfigured address. If the destination address in the control-plane packet matches the preconfigured address, the transport service VNFC 210 delivers the control-plane packet to a kernel protocol stack of an operating system running on the server.

In some embodiments, computing resources and storage resources are allocated to the transport service VNFC 210 based on at least one of the following: the number of data-plane VNFCs served by the transport service VNFC 210, and overall traffic throughput of the data-plane VNFCs.

In some embodiments, the data-plane VNFC 220-1 includes the network address of the transport service VNFC 210 or an identity of the third VNFC 220-2 as a destination address in a further data-plane packet for the terminal device. The third VNFC 220-2 is separated from the transport service VNFC 210 and includes at least one second data-plane application. The data-plane VNFC 220-1 forwards the further packet to the virtual switch 230.

In some embodiments, in response to receipt of the further data-plane packet, the virtual switch 230 determines whether the destination address in the further data-plane packet is the network address of the transport service VNFC 210 or the identity of the third VNFC 220-2. If the virtual switch 230 determines that the destination address in the further data-plane packet is the network address of the transport service VNFC 210, the virtual switch 230 delivers the further data-plane packet to the transport service VNFC 210. If the virtual switch 230 determines that the destination address in the further data-plane packet is the identity of the third VNFC 220-2, the virtual switch 230 delivers the further data-plane packet to the third VNFC 220-2.

In some embodiments, in response to a failure of the data-plane VNFC 220-1 or a determination that traffic throughput of the data-plane VNFC 220-1 exceeds a threshold throughput, the virtual switch 230 delivers the packet to a fourth VNFC based on a second mapping. The second mapping is between the identity of the terminal device and an identity of the fourth VNFC. The fourth VNFC is separated from the transport service VNFC 210 and includes the at least one first data-plane application.

Figure 7:
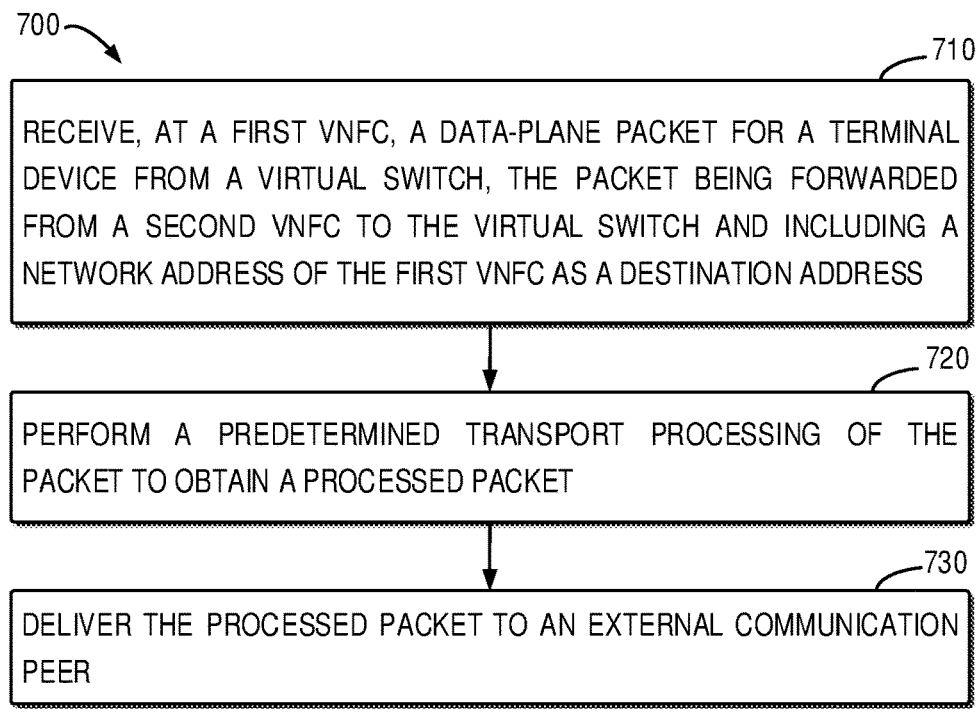
FIG. 7 is a flowchart of a method of delivering packets in accordance with some embodiments of the present disclosure.

FIG. 7 shows a flowchart of an example method 700 in accordance with some embodiments of the present disclosure. For example, the method 700 can be implemented at the transport service VNFC 210, the data-plane VNFC 220-1 and the virtual switch 230 as shown in FIG. 2. It is to be understood that the method 700 may include additional blocks not shown and/or may omit some blocks as shown, and the scope of the present disclosure is not limited in this regard.

At block 710, the transport service VNFC 210 receives a data-plane packet for a terminal device from the virtual switch 230. The packet is forwarded from the data-plane VNFC 220-1 to the virtual switch 230 and includes a network address of the transport service VNFC 210 as a destination address.

At block 720, the transport service VNFC 210 performs a predetermined transport processing of the packet to obtain a processed packet.

At block 730, the transport service VNFC 210 delivers the processed packet to an external communication peer.

In some embodiments, the transport service VNFC 210, the virtual switch 230 and the data-plane VNFC 220-1 are implemented on a single server, a first memory area on the server is allocated to the transport service VNFC 210, a second memory area on the server is allocated to the virtual switch 230, a third memory area on the server is allocated to the data-plane VNFC 220-1, the first memory area, the second memory area and the third memory area are isolated from one another.

In some embodiments, computing resources and storage resources are allocated to the transport service VNFC 210 based on at least one of the following: the number of data-plane VNFCs served by the transport service VNFC 210, and overall traffic throughput of the data-plane VNFCs.

Figure 8:
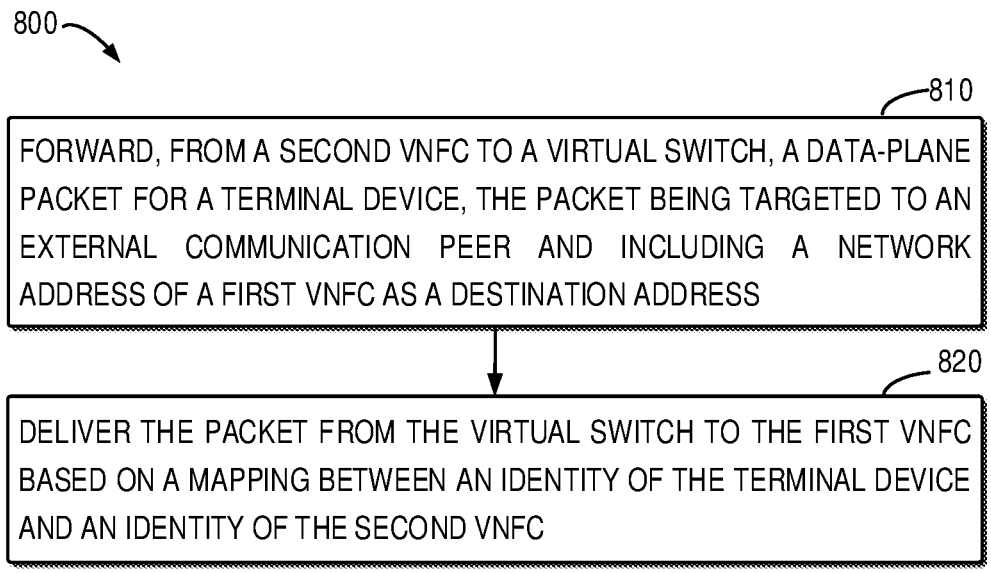
FIG. 8 is a flowchart of a method of delivering packets in accordance with some embodiments of the present disclosure.

FIG. 8 shows a flowchart of an example method 800 in accordance with some embodiments of the present disclosure. For example, the method 800 can be implemented at the transport service VNFC 210, the data-plane VNFC 220-1 and the virtual switch 230 as shown in FIG. 2. It is to be understood that the method 800 may include additional blocks not shown and/or may omit some blocks as shown, and the scope of the present disclosure is not limited in this regard.

At block 810, the data-plane VNFC 220-1 forwards to the virtual switch 230, a data-plane packet for a terminal device. The packet is targeted to an external communication peer and includes a network address of the transport service VNFC 210 as a destination address, the transport service VNFC 210 performing a predetermined transport processing of the packet, the data-plane VNFC 220-1 serving the terminal device and including at least one data-plane application, the data-plane VNFC 220-1 separated from the transport service VNFC 210.

At block 820, the virtual switch 230 delivers the packet to the transport service VNFC 210 based on a mapping between an identity of the terminal device and an identity of the data-plane VNFC 220-1.

In some embodiments, the transport service VNFC 210, the virtual switch 230 and the data-plane VNFC 220-1 are implemented on a single server, a first memory area on the server is allocated to the transport service VNFC 210, a second memory area on the server is allocated to the virtual switch 230, a third memory area on the server is allocated to the data-plane VNFC 220-1, the first memory area, the second memory area and the third memory area are isolated from one another.

Figure 9:
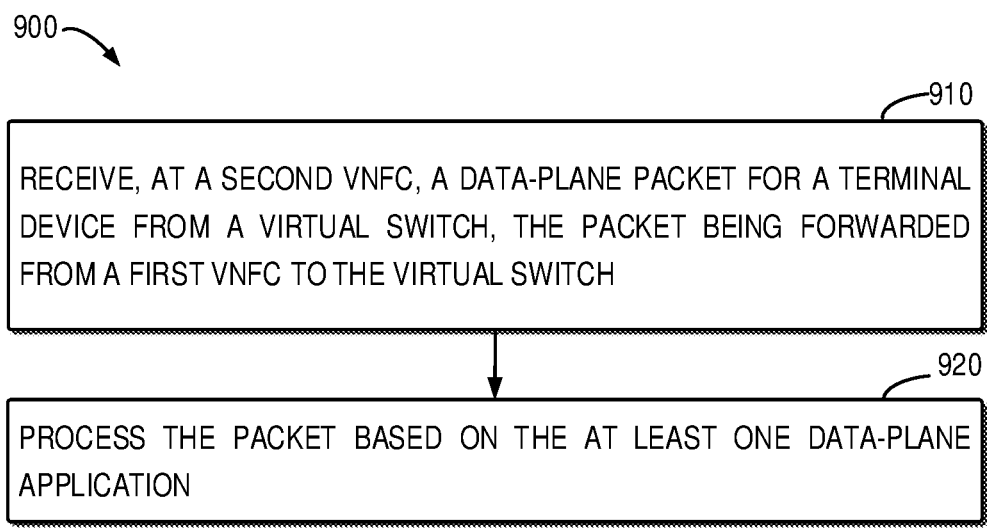
FIG. 9 is a flowchart of a method of delivering packets in accordance with some embodiments of the present disclosure.

FIG. 9 shows a flowchart of an example method 900 in accordance with some embodiments of the present disclosure. For example, the method 900 can be implemented at the transport service VNFC 210, the data-plane VNFC 220-1 and the virtual switch 230 as shown in FIG. 2. It is to be understood that the method 900 may include additional blocks not shown and/or may omit some blocks as shown, and the scope of the present disclosure is not limited in this regard.

At block 910, the data-plane VNFC 220-1 receives a data-plane packet for a terminal device from the virtual switch 230. The packet is forwarded from the transport service VNFC 210 to the virtual switch 230, the transport service VNFC 210 performing a predetermined transport processing of the packet, the data-plane VNFC 220-1 serving the terminal device and including at least one data-plane application, the data-plane VNFC 220-1 separated from the transport service VNFC 210.

At block 920, the data-plane VNFC 220-1 processes the packet based on the at least one data-plane application.

In some embodiments, the transport service VNFC 210, the virtual switch 230 and the data-plane VNFC 220-1 are implemented on a single server, a first memory area on the server is allocated to the transport service VNFC 210, a second memory area on the server is allocated to the virtual switch 230, a third memory area on the server is allocated to the data-plane VNFC 220-1, the first memory area, the second memory area and the third memory area are isolated from one another.

For deployment of the transport service container in FIG. 4, some performance tests are made to profile processing latency and throughput of the transport service container. In the tests, the transport service container uses one dedicated processing core, three sized packets (128 bytes, 800 bytes, 1400 bytes) are used, and the results are showed in Table 1.

TABLE 1

| Packet length (bytes) | Bi-direction average latency(us) | Bi-direction throughput (PPS) |
| --- | --- | --- |
| 128 | 8.59 | 1034768 |
| 800 | 14.35 | 1034768 |
| 1400 | 14.94 | 849104 |

The throughput performance can get almost linear increase while more number of cores added to the transport service container. If the transport service container uses two processing cores, higher throughput performance of about 1.8 times can be achieved.

In some embodiments, an apparatus capable of performing the method 600 (for example, the server 200) may comprise means for performing the respective steps of the method 600. The means may be implemented in any suitable form. For example, the means may be implemented in a circuitry or software module.

In some embodiments, the apparatus comprises: means for performing, in response to receipt of at a first VNFC a data-plane packet for a terminal device, a predetermined transport processing of the packet to obtain a processed packet, the packet including a network address of the first VNFC as a destination address; means for forwarding the processed packet from the first VNFC to a virtual switch; and means for delivering the processed packet from the virtual switch to a second VNFC based on a first mapping between an identity of the terminal device and an identity of the second VNFC, the second VNFC separated from the first VNFC, the second VNFC serving the terminal device and including at least one first data-plane application.

In some embodiments, the first VNFC and the virtual switch are implemented on a single server, a first memory area on the server is allocated to the first VNFC, a second memory area on the server is allocated to the virtual switch, and the first memory area is isolated from the second memory area.

In some embodiments, means for forwarding the processed packet from the first VNFC to the virtual switch comprises: means for causing the processed packet in the first memory area to be accessed by the virtual switch via an address offset adjustment of the second memory area.

In some embodiments, the apparatus further comprises: in response to receipt of, at the first VNFC, a control-plane packet for the terminal device, means for determining whether a destination address in the control-plane packet matches a preconfigured address; and in response to the destination address in the control-plane packet matching the preconfigured address, means for delivering the control-plane packet to a kernel protocol stack of an operating system running on the server.

In some embodiments, computing resources and storage resources are allocated to the first VNFC based on at least one of the following: the number of VNFCs served by the first VNFC, and overall traffic throughput of the VNFCs.

In some embodiments, the apparatus further comprises: means for including, at the second VNFC, the network address of the first VNFC or an identity of a third VNFC as a destination address in a further data-plane packet for the terminal device, the third VNFC separated from the first VNFC and including at least one second data-plane application; and means for forwarding the further packet to the virtual switch.

In some embodiments, the apparatus further comprises: means for determining, in response to receipt of, at the virtual switch, the further data-plane packet, whether the destination address in the further data-plane packet is the network address of the first VNFC or the identity of the third VNFC; means for delivering the further data-plane packet to the first VNFC in response to determining that the destination address in the further data-plane packet is the network address of the first VNFC; and means for delivering the further data-plane packet to the third VNFC in response to determining that the destination address in the further data-plane packet is the identity of the third VNFC.

In some embodiments, the apparatus further comprises: in response to a failure of the second VNFC or a determination that traffic throughput of the second VNFC exceeds a threshold throughput, means for establishing, by a control-plane VNFC, a logical connection between the terminal device and a fourth VNFC, the control-plane VNFC comprising at least one control-plane application, the fourth VNFC separated from the first VNFC and including the at least one first data-plane application; means for configuring, by the control-plane VNFC, the virtual switch with a second mapping, the second mapping being between the identity of the terminal device and an identity of the fourth VNFC; and means for delivering the packet from the virtual switch to the fourth VNFC based on the second mapping.

Figure 10:
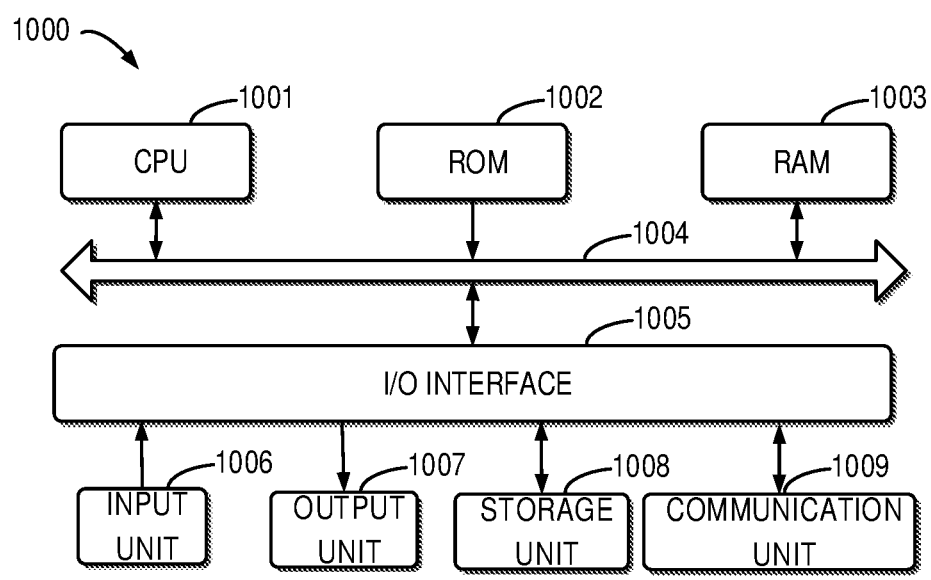
FIG. 10 is a block diagram of a device that is suitable for implementing embodiments of the present disclosure.

FIG. 10 illustrates a schematic block diagram of a device 1000 that can be used to implement the embodiments of the present disclosure. For example, the server 200 as shown in FIG. 2 can be implemented by the device 1000. As shown in FIG. 10, the device 1000 includes a central processing unit (CPU) 1001 which may perform various appropriate actions and processing based on computer program instructions stored in the read only memory (ROM) 1002 or computer program instructions uploaded from storage unit 1008 to the random access memory (RAM) 1003. In the RAM 1003, there further stores various programs and data needed by operation of the device 1000. The CPU 1001, ROM 1002 and RAM 1003 are connected one another via a bus 1004. The input/output (I/O) interface 1005 is also connected to the bus 1004.

The following components in the device 1000 are connected to the I/O interface 1005: including: an input unit 1006, such as a keyboard, a mouse, and the like; an output unit 1007, such as display of various types and loudspeakers; a storage unit 1008, such as magnetic disk and optical disk; a communication unit 1009, such as network card, modem, wireless communication transceiver. The communication unit 1009 allows the device 1000 to exchange data/information with other devices via computer networks, such as Internet and/or telecommunication networks.

The methods described above, such as the methods 600, 700, 800 and 900, can be executed by the processing unit 1001. For example, in some implementations, the methods 600, 700, 800 and 900 can be implemented as a computer software program which is corporeally contained in a machine readable medium, such as the storage unit 1008. In some implementations, the computer program can be partially or wholly loaded and/or mounted on the device 1000 by the ROM 1002 and/or the communication unit 1009. When the computer program is uploaded to the RAM 1003 and executed by the CPU 1001, one or more steps of the method 600 described above can be executed.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

In the context of the present disclosure, the computer program codes or related data may be carried by any suitable carrier to enable the device, apparatus or processor to perform various processes and operations as described above. Examples of the carrier include a signal, computer readable media.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of delivering packets, comprising:

in response to receipt of, at a first Virtual Network Function Component, VNFC, a data-plane packet for a terminal device from a virtual switch, performing a predetermined transport processing of the packet to obtain a processed packet, the packet being targeted to a second VNFC and including a network address of the first VNFC as a destination address;

forwarding the processed packet from the first VNFC to the virtual switch;

delivering the processed packet from the virtual switch to the second VNFC based on a first mapping between an identity of the terminal device and an identity of the second VNFC, the second VNFC separated from the first VNFC, the second VNFC serving the terminal device and including at least one first data-plane application;

in response to receipt of, at the first VNFC, a control-plane packet for the terminal device, determining whether a destination address in the control-plane packet matches a preconfigured address; and in response to the destination address in the control-plane packet matching the preconfigured address, delivering the control-plane packet to a kernel protocol stack of an operating system running on a single server, wherein the first VNFC and the virtual switch are implemented on the single server, a first memory area on the single server is allocated to the first VNFC, a second memory area on the single server is allocated to the virtual switch, and the first memory area is isolated from the second memory area, and wherein forwarding the processed packet from the first VNFC to the virtual switch comprises causing the processed packet in the first memory area to be accessed by the virtual switch via an address offset adjustment of the second memory area.

2. The method of claim 1, further comprising:

including, at the second VNFC, the network address of the first VNFC or an identity of a third VNFC as a destination address in a further data-plane packet for the terminal device, the third VNFC separated from the first VNFC and including at least one second data-plane application;

forwarding the further data-plane packet to the virtual switch;

in response to receipt of, at the virtual switch, the further data-plane packet, determining whether the destination address in the further data-plane packet is the network address of the first VNFC or the identity of the third VNFC;

in response to determining that the destination address in the further data-plane packet is the network address of the first VNFC, delivering the further data-plane packet to the first VNFC; and in response to determining that the destination address in the further data-plane packet is the identity of the third VNFC, delivering the further data-plane packet to the third VNFC.

3. The method of claim 1, further comprising:

in response to a failure of the second VNFC or a determination that traffic throughput of the second VNFC exceeds a threshold throughput, establishing, by a control-plane VNFC, a logical connection between the terminal device and a fourth VNFC, the control-plane VNFC comprising at least one control-plane application, the fourth VNFC separated from the first VNFC and including the at least one first data-plane application;

configuring, by the control-plane VNFC, the virtual switch with a second mapping, the second mapping being between the identity of the terminal device and an identity of the fourth VNFC; and delivering the packet from the virtual switch to the fourth VNFC based on the second mapping.

4. A non-transitory computer-readable medium storing a computer program thereon, the computer program, when executed by a processor, causing the processor to carry out the method according to claim 1.

5. A method of delivering packets, comprising:

receiving, at a first Virtual Network Function Component, VNFC, a data-plane packet for a terminal device from a virtual switch, the packet being forwarded from a second VNFC to the virtual switch and including a network address of the first VNFC as a destination address, the second VNFC separated from the first VNFC, the second VNFC serving the terminal device and including at least one first data-plane application;

performing a predetermined transport processing of the packet to obtain a processed packet;

forwarding the processed packet from the first VNFC to the virtual switch;

delivering the processed packet to an external communication peer;

in response to receipt of, at the first VNFC, a control-plane packet for the terminal device, determining whether a destination address in the control-plane packet matches a preconfigured address; and in response to the destination address in the control-plane packet matching the preconfigured address, delivering the control-plane packet to a kernel protocol stack of an operating system running on a single server, wherein the first VNFC and the virtual switch are implemented on the single server, a first memory area on the single server is allocated to the first VNFC, a second memory area on the single server is allocated to the virtual switch, and the first memory area is isolated from the second memory area, and wherein forwarding the processed packet from the first VNFC to the virtual switch comprises causing the processed packet in the first memory area to be accessed by the virtual switch via an address offset adjustment of the second memory area.

6. A non-transitory computer-readable medium storing a computer program thereon, the computer program, when executed by a processor, causing the processor to carry out the method according to claim 5.

7. A method of delivering packets, comprising:

forwarding, from a second Virtual Network Function Component, VNFC to a virtual switch, a data-plane packet for a terminal device, the packet being targeted to an external communication peer and including a network address of a first VNFC as a destination address, the first VNFC performing a predetermined transport processing of the packet and forwarding the processed packet to the virtual switch, the second VNFC serving the terminal device and including at least one data-plane application, the second VNFC separated from the first VNFC;

delivering the packet from the virtual switch to the first VNFC based on a mapping between an identity of the terminal device and an identity of the second VNFC;

in response to receipt of, at the first VNFC, a control-plane packet for the terminal device, determining whether a destination address in the control-plane packet matches a preconfigured address; and in response to the destination address in the control-plane packet matching the preconfigured address, delivering the control-plane packet to a kernel protocol stack of an operating system running on a single server, wherein the first VNFC and the virtual switch are implemented on the single server, a first memory area on the single server is allocated to the first VNFC, a second memory area on the single server is allocated to the virtual switch, and the first memory area is isolated from the second memory area, and wherein forwarding the processed packet from the first VNFC to the virtual switch comprises causing the processed packet in the first memory area to be accessed by the virtual switch via an address offset adjustment of the second memory area.

8. A non-transitory computer-readable medium storing a computer program thereon, the computer program, when executed by a processor, causing the processor to carry out the method according to claim 7.

9. A method of delivering packets, comprising:

receiving, at a second Virtual Network Function Component, VNFC, a data-plane packet for a terminal device from a virtual switch, the packet being forwarded from a first VNFC to the virtual switch, the first VNFC performing a predetermined transport processing of the packet and forwarding the processed packet to the virtual switch, the second VNFC serving the terminal device and including at least one data-plane application, the second VNFC separated from the first VNFC;

processing the packet based on the at least one data-plane application;

in response to receipt of, at the first VNFC, a control-plane packet for the terminal device, determining whether a destination address in the control-plane packet matches a preconfigured address; and in response to the destination address in the control-plane packet matching the preconfigured address, delivering the control-plane packet to a kernel protocol stack of an operating system running on a single server, wherein the first VNFC and the virtual switch are implemented on the single server, a first memory area on the single server is allocated to the first VNFC, a second memory area on the single server is allocated to the virtual switch, and the first memory area is isolated from the second memory area, and wherein forwarding the processed packet from the first VNFC to the virtual switch comprises causing the processed packet in the first memory area to be accessed by the virtual switch via an address offset adjustment of the second memory area.

10. A non-transitory computer-readable medium storing a computer program thereon, the computer program, when executed by a processor, causing the processor to carry out the method according to claim 9.

11. A device for delivering packets, comprising:

at least one processor; and at least one memory including computer program code;

the at least one memory and the computer program code configured to, with the at least one processor, cause the device to perform acts comprising:

in response to receipt of, at a first Virtual Network Function Component, VNFC, a data-plane packet for a terminal device from a virtual switch, performing a predetermined transport processing of the packet to obtain a processed packet, the packet being targeted to a second VNFC and including a network address of the first VNFC as a destination address;

forwarding the processed packet from the first VNFC to the virtual switch;

delivering the processed packet from the virtual switch to the second VNFC based on a first mapping between an identity of the terminal device and an identity of the second VNFC, the second VNFC separated from the first VNFC, the second VNFC serving the terminal device and including at least one first data-plane application;

in response to receipt of, at the first VNFC, a control-plane packet for the terminal device, determining whether a destination address in the control-plane packet matches a preconfigured address; and in response to the destination address in the control-plane packet matching the preconfigured address, delivering the control-plane packet to a kernel protocol stack of an operating system running on a single server, wherein the first VNFC and the virtual switch are implemented on the single server, a first memory area on the single server is allocated to the first VNFC, a second memory area on the single server is allocated to the virtual switch, and the first memory area is isolated from the second memory area, and wherein forwarding the processed packet from the first VNFC to the virtual switch comprises causing the processed packet in the first memory area to be accessed by the virtual switch via an address offset adjustment of the second memory area.

12. The device of claim 11, wherein the acts further comprises:

including, at the second VNFC, the network address of the first VNFC or an identity of a third VNFC as a destination address in a further data-plane packet for the terminal device, the third VNFC separated from the first VNFC and including at least one second data-plane application;

forwarding the further data plane packet to the virtual switch;

in response to receipt of, at the virtual switch, the further data-plane packet, determining whether the destination address in the further data-plane packet is the network address of the first VNFC or the identity of the third VNFC;

in response to determining that the destination address in the further data-plane packet is the network address of the first VNFC, delivering the further data-plane packet to the first VNFC; and in response to determining that the destination address in the further data-plane packet is the identity of the third VNFC, delivering the further data-plane packet to the third VNFC.

13. The device of claim 11, wherein the acts further comprises:

in response to a failure of the second VNFC or a determination that traffic throughput of the second VNFC exceeds a threshold throughput, delivering the packet from the virtual switch to a fourth VNFC based on a second mapping, the second mapping being between the identity of the terminal device and an identity of the fourth VNFC, the fourth VNFC separated from the first VNFC and including the at least one first data-plane application.

14. A device for delivering packets, comprising:
at least one processor; and
at least one memory including computer program code;
the at least one memory and the computer program code configured to, with the at least one processor, cause the device to perform acts comprising:
receiving, at a first Virtual Network Function Component, VNFC, a data-plane packet for a terminal device from a virtual switch, the packet being forwarded from a second VNFC to the virtual switch and including a network address of the first VNFC as a destination address, the second VNFC separated from the first VNFC, the second VNFC serving the terminal device and including at least one first data-plane application;
performing a predetermined transport processing of the packet to obtain a processed packet;
forwarding the processed packet from the first VNFC to the virtual switch;
delivering the processed packet to an external communication peer;
in response to receipt of, at the first VNFC, a control-plane packet for the terminal device, determining whether a destination address in the control-plane packet matches a preconfigured address; and
in response to the destination address in the control-plane packet matching the preconfigured address, delivering the control-plane packet to a kernel protocol stack of an operating system running on a single server,
wherein the first VNFC and the virtual switch are implemented on the single server, a first memory area on the single server is allocated to the first VNFC, a second memory area on the single server is allocated to the virtual switch, and the first memory area is isolated from the second memory area, and
wherein forwarding the processed packet from the first VNFC to the virtual switch comprises causing the processed packet in the first memory area to be accessed by the virtual switch via an address offset adjustment of the second memory area.

15. A device of delivering packets, comprising:
at least one processor; and
at least one memory including computer program code;
the at least one memory and the computer program code configured to, with the at least one processor, cause the device to perform acts comprising:
forwarding, from a second Virtual Network Function Component, VNFC to a virtual switch, a data-plane packet for a terminal device, the packet being targeted to an external communication peer and including a network address of a first VNFC as a destination address, the first VNFC performing a predetermined transport processing of the packet and forwarding the processed packet to the virtual switch, the second VNFC serving the terminal device and including at least one data-plane application, the second VNFC separated from the first VNFC;
delivering the packet from the virtual switch to the first VNFC based on a mapping between an identity of the terminal device and an identity of the second VNFC;
in response to receipt of, at the first VNFC, a control-plane packet for the terminal device, determining whether a destination address in the control-plane packet matches a preconfigured address; and
in response to the destination address in the control-plane packet matching the preconfigured address, delivering the control-plane packet to a kernel protocol stack of an operating system running on a single server,
wherein the first VNFC and the virtual switch are implemented on the single server, a first memory area on the single server is allocated to the first VNFC, a second memory area on the single server is allocated to the virtual switch, and the first memory area is isolated from the second memory area, and
wherein forwarding the processed packet from the first VNFC to the virtual switch comprises causing the processed packet in the first memory area to be accessed by the virtual switch via an address offset adjustment of the second memory area.

16. A device for delivering packets, comprising:
at least one processor; and
at least one memory including computer program code;
the at least one memory and the computer program code configured to, with the at least one processor, cause the device to perform acts comprising:
receiving, at a second VNFC, a data-plane packet for a terminal device from a virtual switch, the packet being forwarded from a first VNFC to the virtual switch, the first VNFC performing a predetermined transport processing of the packet and forwarding the processed packet to the virtual switch, the second VNFC serving the terminal device and including at least one data-plane application, the second VNFC separated from the first VNFC;
processing the packet based on the at least one data-plane application;
in response to receipt of, at the first VNFC, a control-plane packet for the terminal device, determining whether a destination address in the control-plane packet matches a preconfigured address; and
in response to the destination address in the control-plane packet matching the preconfigured address, delivering the control-plane packet to a kernel protocol stack of an operating system running on a single server,
wherein the first VNFC and the virtual switch are implemented on the single server, a first memory area on the single server is allocated to the first VNFC, a second memory area on the single server is allocated to the virtual switch, and the first memory area is isolated from the second memory area, and
wherein forwarding the processed packet from the first VNFC to the virtual switch comprises causing the processed packet in the first memory area to be accessed by the virtual switch via an address offset adjustment of the second memory area.

* * * * *